(12) United States Patent
Cheng et al.

(10) Patent No.: US 11,511,355 B2
(45) Date of Patent: Nov. 29, 2022

(54) ADAPTIVE PRECISION CHUCK

(71) Applicant: Brunel University London, Middlesex (GB)

(72) Inventors: Kai Cheng, Middlesex (GB); Ali Khaghani, Middlesex (GB)

(73) Assignee: BRUNEL UNIVERSITY LONDON, Middlesex (GB)

(*) Notice: Subject to any disclaimer, the term of this patent is extended or adjusted under 35 U.S.C. 154(b) by 103 days.

(21) Appl. No.: 17/068,428

(22) Filed: Oct. 12, 2020

(65) Prior Publication Data

US 2021/0107068 A1   Apr. 15, 2021

(30) Foreign Application Priority Data

Oct. 10, 2019 (GB) .................................... 1914672

(51) Int. Cl.
*B23B 31/14* (2006.01)
*B23B 31/30* (2006.01)

(52) U.S. Cl.
CPC .......... *B23B 31/142* (2021.01); *B23B 31/307* (2013.01); *B23B 2231/22* (2013.01); *B23B 2270/06* (2013.01); *Y10T 279/247* (2015.01)

(58) Field of Classification Search
CPC ..... B23B 31/14; B23B 31/142; B23B 31/307; B23B 2231/22; B23B 2270/06; Y10T 279/247
See application file for complete search history.

(56) References Cited

U.S. PATENT DOCUMENTS

| | | | |
|---|---|---|---|
| 4,645,219 A | 2/1987 | Link et al. | |
| 4,802,680 A * | 2/1989 | Fuchs | B23Q 1/36 269/254 R |
| 5,833,246 A | 11/1998 | Trot | |
| 5,997,223 A * | 12/1999 | Kosmowski | B23Q 5/04 408/124 |
| 6,443,462 B2 * | 9/2002 | Tempest | F16D 1/0858 279/131 |
| 7,547,168 B1 * | 6/2009 | Kosmowski | B23Q 1/70 279/131 |
| 8,141,884 B2 * | 3/2012 | Retzbach | F16D 1/0858 279/131 |
| 8,826,511 B2 * | 9/2014 | Barnes | H01L 27/14683 29/527.1 |
| 9,050,661 B1 * | 6/2015 | Kosmowski | F16D 43/18 |

(Continued)

FOREIGN PATENT DOCUMENTS

CN   103203643 A  *  7/2013
DE     3204987 A1 *  8/1983
(Continued)

*Primary Examiner* — Eric A. Gates
(74) *Attorney, Agent, or Firm* — Leason Ellis LLP (57) ABSTRACT

An adaptive precision chuck for a precision/ultraprecision machining system is described. The chuck (200) defining a mount for receiving a workpiece (300) wherein, when in use, the centre of the mount is configured to be substantially concentric with an axis of rotation (214) of the machining system, the chuck (200) further including jaws (201) about the mount and a plurality of compliant flexures (203-206) configured, upon application of rotational forces by the machining system to the chuck about the axis of rotation (214), to engage the jaws (210) upon a workpiece (300) in the mount.

14 Claims, 5 Drawing Sheets

(56) References Cited

U.S. PATENT DOCUMENTS

| | | | |
|---|---|---|---|
| 9,447,823 B2 * | 9/2016 | Kimman | F16D 1/0858 |
| 2002/0105149 A1 * | 8/2002 | Karst | A61C 1/144 |
| | | | 279/131 |
| 2007/0235954 A1 | 10/2007 | Rehm | |
| 2019/0091880 A1 | 3/2019 | Andre | |

FOREIGN PATENT DOCUMENTS

| | | | |
|---|---|---|---|
| DE | 102020113330 B3 * | 5/2021 | |
| FR | 1185810 A * | 8/1959 | |
| SU | 776775 | 11/1980 | |

\* cited by examiner

FIG. 3
Section R-R

FIG. 4
Section S-S

Rest Position
FIG. 5a

Stage 01
FIG. 5b

Stage 02
FIG. 5c

SECTION Y-Y
FIG. 7b

SECTION Z-Z
FIG. 7c

ADAPTIVE PRECISION CHUCK

CROSS-REFERENCE TO RELATED APPLICATION

This application claims priority to GB Patent Application No. 1914672.9 filed Oct. 10, 2019, the contents of which are incorporated by reference in its entirety as if set forth herein.

FIELD OF THE INVENTION

The present invention relates to an adaptive precision chuck that is particularly applicable for use in high precision engineering and machining.

BACKGROUND TO THE INVENTION

Chucks are often used to hold and position workpieces while they are being machined using spindle-based tools such as lathes. Typically, the intention is for the chuck to securely retain the workpiece in place so that there is a shared common axis between a designated centre of the workpiece and the tool. During machining, one or both of the chuck and tool are typically rotated about the common axis and if the workpiece is not centred or its position unintentionally deviates during machining, errors and defects in machining and/or damage to the workpiece may arise.

In ultraprecision turning machines such as single point diamond turning machines (DTM), the exact alignment of the workpiece centre with the machine spindle rotational axis is especially important. One example application for ultraprecision turning is in the production of contact lenses. It will be appreciated that if elements that impact the optical profile such as the lens curvature is out by even microns, it potentially undermines the correction intended to be provided.

In precision production using a diamond turning machine, the efficiency of clamping each workpiece and the repeatability of precision clamping and holding of the workpiece is a major factor in the performance of the machining system.

Misalignment between the centre of the workpiece and the spindle rotational axis affects the finished dimensional and form accuracy of the workpiece and likely surface finish of the workpiece. It can also affect machining dynamics because of the impact it has on centrifugal force.

Where there is a misalignment, it leads to concentrically unequal off-centre movement (runout), which can further cause the machining errors and the cutting tool wear (or uneven cutting tool wear). Therefore, precision alignment of the workpiece clamped onto the spindle prior to and during the machining process is desired. Ultraprecision diamond turning machines often use a vacuum chuck or a magnetic clamping system. In either case, they require manual mounting and tuning by a skilled operator so as to minimize runout and ensure the desired precision machining.

In the case of vacuum chucks, misalignment can arise during the machining process if the machining force overcomes the clamping force.

There have been attempts to minimise spindle and workpiece radial runout in precision and ultraprecision machining systems. In some cases, workpiece specific holders that closely match the shape or other properties of the workpiece have been proposed. However, these reduce the flexibility of the machining system and increase costs. Other attempts have focussed on centring and jaw mechanism used to retain the workpiece in the chuck. Typically, these often complex to manufacture and use and comprise of many components. Generally they are not cost-effective.

More recently, clamping mechanisms known as "zero point clamping systems" have been proposed. While these reduce misalignment and runout, setup can be time-consuming, the clamping devices complex and made from numerous moving parts and therefore expensive to manufacture no tolerance and friction requirements within the sub-assemblies, which can significantly thus enhance the accuracy and performance of the clamping device as a whole.

BRIEF SUMMARY OF THE INVENTION

According to an aspect of the present invention, there is provided an adaptive precision chuck for a precision/ultra-precision machining system, the chuck defining a mount for receiving a workpiece wherein when in use the centre of the mount is substantially concentric with an axis of rotation of the machining system. The chuck further includes jaws about the mount and a plurality of compliant flexures configured, upon application of rotational forces by the machining system to the chuck about the axis of rotation, to engage the jaws upon a workpiece in the mount.

Preferably, the adaptive precision chuck is formed as a single integrated device. Preferably, the adaptive precision chuck is formed from titanium or a similar material. In preferred embodiments, as the chuck is a single highly integrated device using flexure design, rather than conventional designs that use multiple components in a mechanical assembly, a greater degree of precision control and adaptability can be achieved. In preferred embodiments, the adaptive chuck can perform concentric positioning and clamping simultaneously.

Preferred embodiments use substantially frictionless elements (preferably in the form of compliant flexures). The flexures are preferably disposed in the body of the adaptive chuck which has a mount for a workpiece. The flexures are configured such that upon such that upon application of a rotational force about a central axis of the chuck (which typically is co-axial with a central axis of the workpiece when mounted) the flexures are acted upon by the rotational force and cause the body to apply centring and locking forces upon a workpiece in the mount. The flexures are preferably positioned and configured to provide self-centring so as to substantially eliminate any misalignment between the workpiece and the chuck's rotational axis.

The present invention seeks to provide an adaptive chuck that, when compared to prior known chucks, is robust, requires minimal setup to mount a workpiece and has a low number of sub-assemblies (or no sub-assemblies), thereby reducing manufacture and assembly overheads.

Embodiments of the present invention seek to provide an adaptive chuck having a mount for holding a workpiece. In preferred embodiments, the chuck is preferably mountable onto a spindle or other mechanism that can provide rotary action to the chuck about a central axis of the chuck. In preferred embodiments, the chuck includes flexures that, upon application of the rotary action, is responsive to flex the body of the chuck and to center the workpiece with respect to the center axis.

As a result of using flexures, a chuck according to embodiments of the present invention can be manufactured as a single integrated device. This prevents the unnecessary friction and issues with tolerances that arise in multi-part device assemblies.

Embodiments are particularly suited to simplifying and easing user operations during machining setup for mass production, particularly in ultraprecision production of contact lens moulds. Preferred embodiments are integrated with or mountable to a vacuum chuck system such that vacuum forces are applied via the vacuum chuck to the adaptive chuck. A further embodiment is directed to a vacuum chuck diamond turning machine, which uses the vacuum forces as the actuation drive for clamping displacement.

In preferred embodiments, centering, alignment and clamping is provided to a mounted workpiece by:
(1) Self-centering the workpiece and aligning it with the central (rotary) axis;
(2) Holding the workpiece in place by one or more hinge flexure driven points (jaws);
(3) Applying a self-lock holding action on the workpiece in the mount during the machining process through the centrifugal force in line with the spindle/workpiece rotations, so the workpiece is secured in the position in either CW and CCW rotational directions.

Flexure mechanisms employ compliance of the material elasticity. Conditions such as wear, backlash and friction can be eliminated through adaptive flexure design. Beneficially, where a flexure is of successive monolithic construction, a compliant flexure mechanism can offer a sub-micron accuracy. The compliant flexures can also significantly integrate the components that would otherwise be part of an assembly and thereby reduce the noise and lubrication demands with high precision motion and repeatability.

Selected advantages of embodiments the present invention include:
(1) Exact alignment capability between the workpiece and central spindle axes working at both low and high speeds (for example low speed may be around 100 rpm while high speed may be around 2000 rpm, although this may depend on factors such as the machining performed, the flexures and also the workpiece);
(2) Sub-micron accuracy in the spindle positioning registration;
(3) A lightweight and efficient integrated assembly, producing less noise and needing less lubrication than existing designs, efficient user-defined setup;
(4) Being applicable for ultraprecision production purposes, self-locking and secured work holding.

BRIEF DESCRIPTION OF THE DRAWINGS

An embodiment of the invention will now be described by way of example only with reference to the accompanying drawings in which.

DETAILED DESCRIPTION

Unless otherwise stated, common reference numerals amongst the illustrations refer to the same or corresponding features. It will, however, be appreciated that the particular size and layout of the body of the chuck, and the positioning and number of flexures can be varied while still providing the same self-centering and self-locking functionality.

Figure 1:
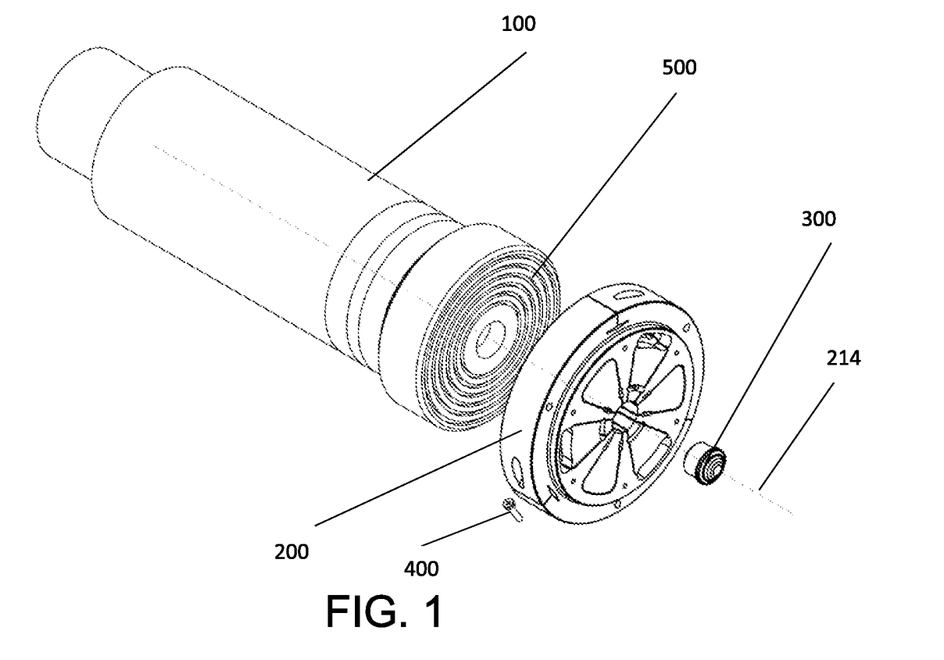
FIG. 1 is a perspective view of a spindle assembly including an adaptive chuck according to an embodiment of the present invention.

FIG. 1 is a perspective view of a spindle assembly including an adaptive chuck according to an embodiment of the present invention.

The Spindle assembly includes a spindle 100 and a vacuum chuck 500 that are attached to, or part of, a diamond turning machine or other similar precision machining system. The adaptive chuck 200 is mounted on the vacuum chuck 500 and is preferably fastened in location, in this example by three socket head cap screws 400. The adaptive chuck 200 and spindle 100 have a common axis 214 about which the spindle is rotated during operation.

The adaptive chuck 200 has a body and defines a mount. In this example, the mount is for holding a contact lens mould insert 300 (workpiece) for ultraprecision machining by the diamond turning machine. It will be appreciated that many different workpieces could be accommodated and that the shape and features of the mount for holding the workpiece in place may also vary depending on the particular workpiece.

Figure 2:
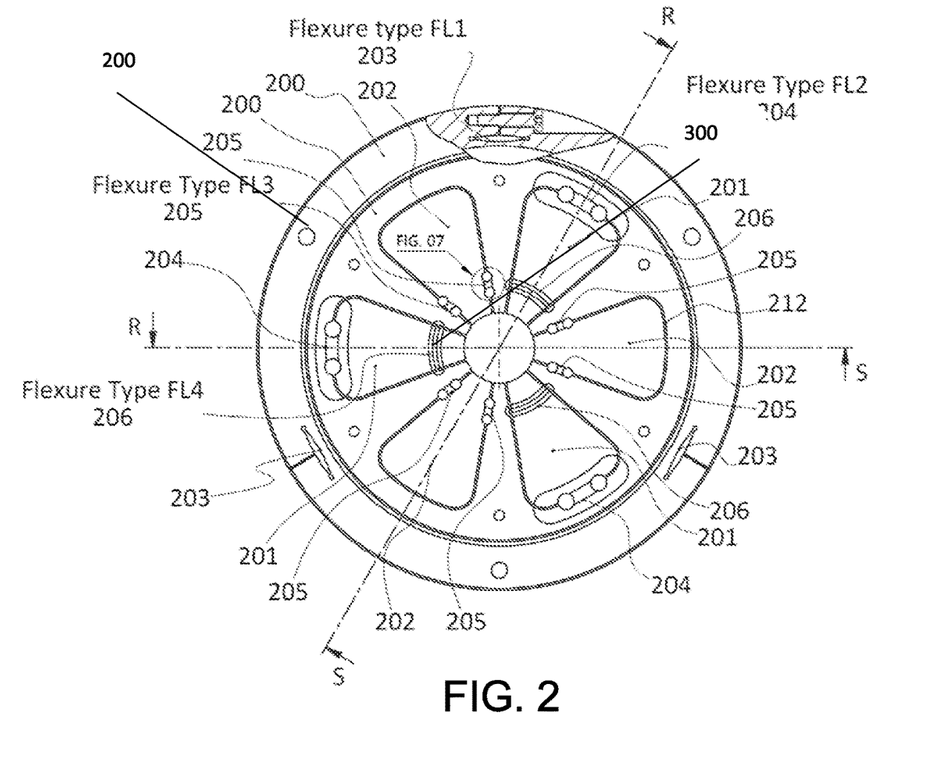
FIG. 2 is a sectional view of the adaptive chuck of FIG. 1.

FIG. 2 is a sectional view of the adaptive chuck of FIG. 1. The adaptive chuck 200 includes integrated flexures of four different types as will be described in detail below. However, it will be appreciated that the number of flexures and their types may vary in embodiments of the present invention. The body of the adaptive chuck 200 has three primary functions:
i) to mount on the precision machining system;
ii) to allow flexing of the flexures to perform their desired function;
iii) to provide a mount for a workpiece.

It will therefore be appreciated that the size, shape, configuration and features of the body (such as screw holes etc.) may vary depending on the machining system to which it is to be mounted, connected (or integrated with), the flexures being used and also the workpiece to be mounted. Preferably, the adaptive chuck 200 is formed as one fully integrated part. In preferred embodiments, the adaptive chuck has two functions:
i) to center the mounted workpiece respect to the common axis 214;
ii) to clamp the workpiece 300 in the position.

It will be appreciated that chucks that are only self-centering or only self-clamping when put under rotational forces are possible within the scope of the present invention by omitting the other flexures.

During the machining process, the spindle 100 is rotated about the common axis 214. The forces resulting on the adaptive chuck cause the flexures to flex and in turn apply centering and locking forces upon the workpiece 300 in the mount.

The adaptive chuck 200 includes in this embodiment two types of jaws: clamping and self-locking. All these jaws have the are through-slotted 212 and connect through the flexures to the main body of the chuck 200.

In the illustrated embodiment, the adaptive chuck 200 can be set up the following sequence of steps. Firstly, it can be adjusted on the vacuum chuck 500. Flexure type FL1 203 has the capability to adjust the whole adaptive chuck with preferably submicron displacement by converting the horizontal movement generated by the screw cap 400 to vertical micro positioning. At this step, the adaptive chuck 200 is mounted concentrically with the spindle against its current runout. The adaptive chuck is always matched with the spindle radial runout. Axial adjustment of the adaptive chuck can be done once at the beginning of the machining process.

Figure 3:
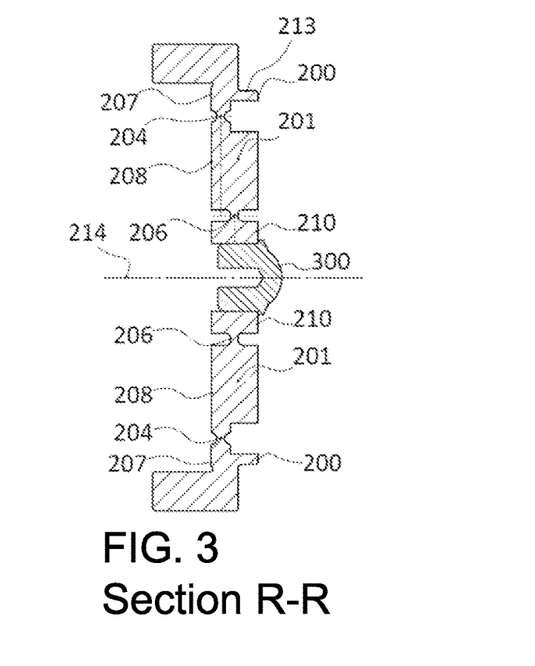
FIG. 3 is a cross-sectional view of the adaptive chuck of FIG. 2 along R-R.
Figure 4:
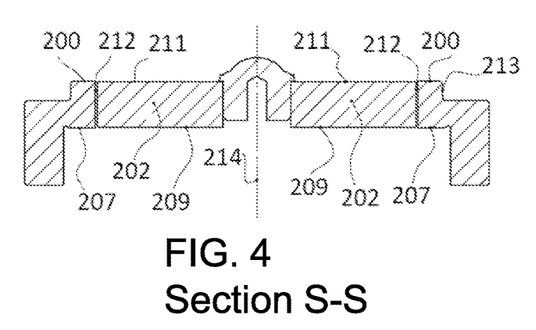
FIG. 4 is a cross-sectional view of the adaptive chuck of FIG. 2 along S-S.

It will be appreciated that the chuck could be formed as part of the vacuum chuck, fixed or otherwise permanently attached to it. In such arrangements, flexure FL1 could be omitted. Cylindrical face 213 as illustrated in FIG. 3 can be employed for dialing the adaptive chuck by adjusting flexure FL1 during initial installation of the adaptive chuck on the vacuum chuck. The second step is loading the workpiece 300 in the mount. This is placed loosely in place and once the vacuum chuck 500 activates, the vacuum forces cause the flexures to flex and clamp the workpiece in the mount 202.

The vacuum force actuates the clamping jaws 201 towards the axial direction. Flexure Type FL2 204 works as an elliptical flexure hinge and creates pivoting moments, such that the clamping jaws 201 are fixed relative to the body of the smart chuck but are free to move on the side adjacent with the workpiece. The (preferably) flat surface of the main body of the adaptive chuck 207 mates with the (preferably) flat surface of the vacuum chuck 500 and the back face of the jaws 208 preferably has a gap to prepare the displacement of the jaws 201 from the hinge 204 being provided by the vacuum force. This mechanism causes the jaws 201 to engage the workpiece (in the illustrated embodiment at three points) due to the momentum displacement caused by pivoting flexure 204. At this stage, the jaws locate the workpiece in the center of the mount and thereby align the workpiece with the center axis 214.

Figure 5A:
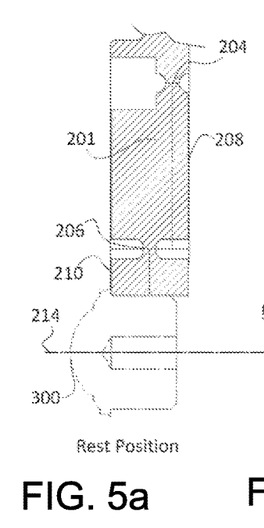
FIG. 5a is a perspective view of a section of the adaptive chuck of FIG. 1 showing a part of the chuck body incorporating a first flexure type and a second flexure type.
Figure 5B:
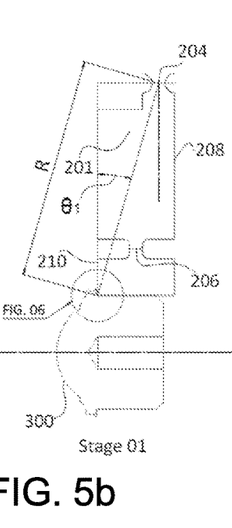
FIG. 5b is a cross-sectional view of FIG. 5a showing the flexures and body part at rest.
Figure 5C:
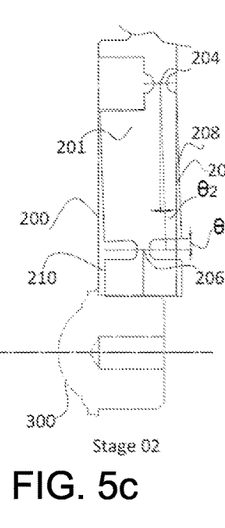
FIG. 5c is a cross-sectional view of FIG. 5a showing the actuation of the first flexure type when the chuck is subjected to a rotational force about the center axis.
Figure 5D:
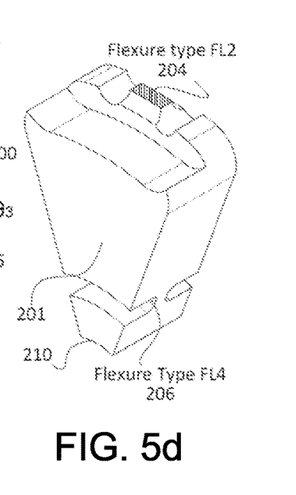
FIG. 5d is a cross-sectional view of FIG. 5a showing the actuation of the second flexure type when the chuck is subjected to a rotational force about the center axis.
Figure 6:
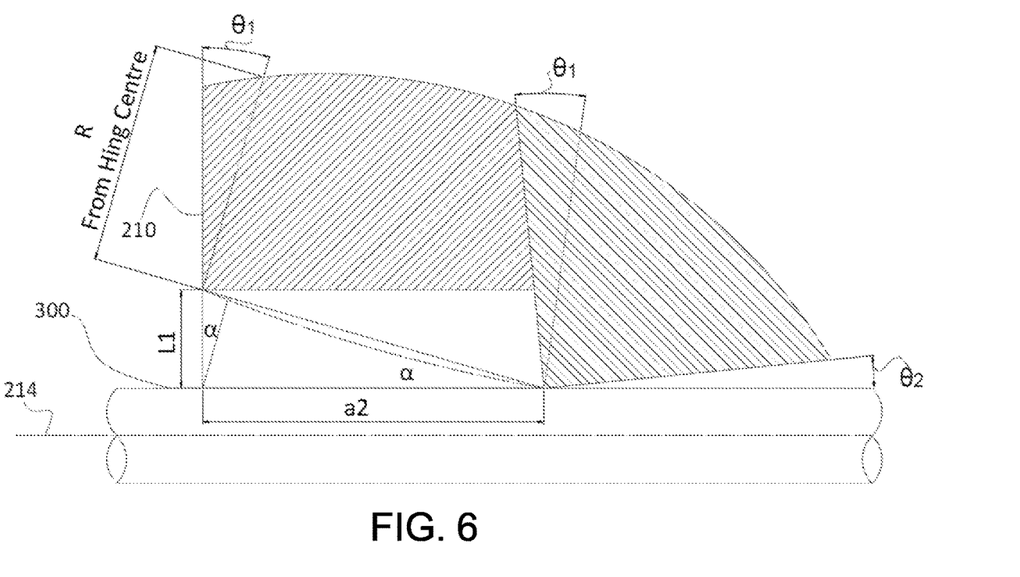
FIG. 6 is an illustration showing the forces and actions discussed in FIG. 5c.
Figure 7A:
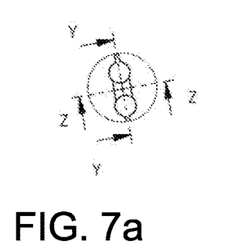
FIGS. 7a-7c are, respectively, a plan view, a sectional view along Y-Y and a sectional view along Z-Z of a flexure of a third type; and, FIGS. 8a and 8b are, respectively, a perspective view of a section of the adaptive chuck of FIG. 1 showing a part of the chuck body incorporating the flexure type of FIGS. 7a-7c, and an illustration showing the forces and actions discussed in FIG. 7a-7c.
Figure 7B:
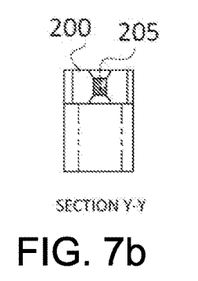
Figure 7C:
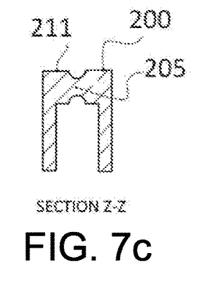
Figure 8A:
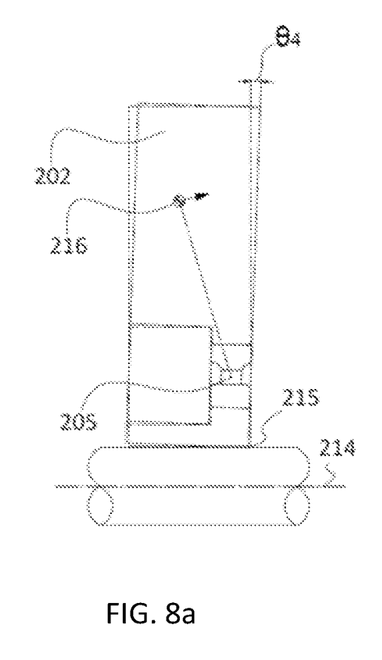
Figure 8B:
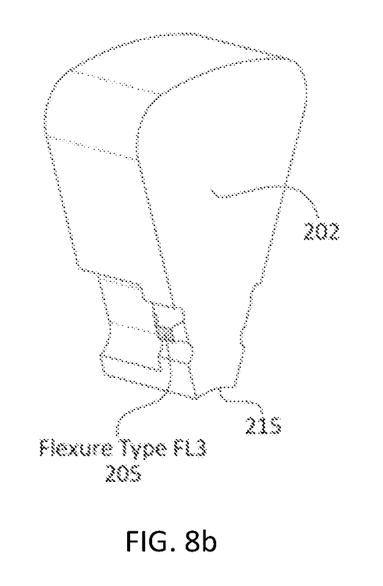

FIGS. 5 and 6 illustrate the details of the workpiece clamping. FIG. 5a is a perspective view of a section of the adaptive chuck of FIG. 1 showing a part of the chuck body incorporating a first flexure type and a second flexure type. FIG. 5b is a cross-sectional view of FIG. 5a showing the flexures and body part at rest. FIG. 5c is a cross-sectional view of FIG. 5a showing the actuation of the first flexure type when the chuck is subjected to a rotational force about the center axis. FIG. 5d is a cross-sectional view of FIG. 5a showing the actuation of the second flexure type when the chuck is subjected to a rotational force about the center axis. FIG. 6 is an illustration showing the forces and actions discussed in FIG. 5c.

The rest position, shown in FIG. 5b, shows the section of the chuck without forces being exerted upon it. The workpiece is shown in dotted lines. The rest position is for loading/unloading the workpiece and is the default position/configuration of the adaptive chuck in the absence of rotational forces from the spindle. There is preferably a surface gap between the front face of the jaws 201 and main body 200 to prevent the friction in the workpiece outer surface. However, the workpiece is always in contact with the main body 200 and prevents movement in Z-Direction (Axis of the Spindle) when the jaws 201 are being actuated. At Stage 1 (FIG. 5c), when the spindle is rotated, the flexures flex and actuate the jaws 201. The clearance L1 between the workpiece and the jaws 201 will be filled. The values of the $\theta 1$ and R (magnitude of the slope) are always constant and from these two parameters the value of the maximum displacement $a2$ in Z-Direction, and $\theta 2$ can be calculated. At this stage, the workpiece 300 is aligned with the spindle axis center 214.

At Stage 02 (FIG. 5d), the inner face of the jaws 201 will be fully contacted with the workpiece by flexing of the elliptical Flexure Type FL4 206. Preferably at this stage, the workpiece 300 is fully aligned with the spindle axis 214 and clamped in the position expected. The value of $\theta 2$ is now changed to Zero and $\theta 3$ will be evaluated based on the flexure structural elasticity at the flexure type FL4 206.

FIGS. 4, 7a, 7b, 7c, 8a, and 8b illustrate the self-locking functionality of the adaptive chuck 200 during the machining process.

Three identical jaws 201 have the duty for workpiece locking 205 against any misalignment during the machining process. The jaws 201 have the feature of enabling the clamping force dependent on the spindle speed, i.e. increasing the spindle speed correspondingly increasing the clamping force because of the centrifugal effects. Flexure type FL3 205 provides this function. The flexure 205 is deliberately located off from the center of mass 216 of the jaws 201. Therefore, it will create centrifugal moment and force from the pivoting point 205 of the flexure, and this momentum will cause a torsion with angular displacement $\theta 4$ in the flexure and substantially displace the adjacent edge 205 of the jaws toward the workpiece outer surface. However, the connection between the jaws 201 and workpiece 300 at this stage is single point connection, which is between the edge 205 to the surface instead of the surface to surface.

In one embodiment, the adaptive chuck is made from a single piece of Titanium and is a single highly integrated piece of device. The use of Titanium has the advantages in mechanical property including elasticity, strength, fatigue performance and light-weightiness, although the adaptive chuck could be made from other materials. The adaptive chuck can be formed and produced using the processes such as precision turning, micro-milling, ultraprecision diamond turning and wire EDM in a highly innovative integrated manner.

The invention claimed is:

1. An adaptive precision chuck for a precision machining system, the chuck defining a mount for receiving a workpiece wherein, when in use the center of the mount is configured to be substantially concentric with an axis of rotation of the machining system, the chuck further including jaws about the mount and a plurality of compliant flexures configured, upon application of rotational forces by the machining system to the chuck about the axis of rotation, to engage the jaws upon a workpiece in the mount, further wherein the chuck is mountable via mounting means to the machining system and the chuck includes third flexures associated with the mounting means, the mounted position of the chuck on the machining system being adjustable via one or more forces applied to the third flexures.

2. The adaptive precision chuck of claim 1, wherein the adaptive precision chuck is formed as a single integrated device.

3. The adaptive precision chuck of claim 1, wherein the adaptive precision chuck is formed from titanium.

4. The adaptive precision chuck of claim 1, wherein the flexures include first flexures and second flexures, the first flexures being configured to be responsive to rotational forces about the axis of rotation to engage the jaws upon a workpiece in the mount.

5. The adaptive precision chuck of claim 4 wherein the first flexures being configured to engage the jaws and cause the jaws to each apply a substantially equal force to the workpiece in the mount.

6. The adaptive precision chuck of claim 5, wherein the first flexures are configured to apply a force via the jaws to the workpiece that is at least partially dependent on the rotational forces applied to the chuck about the axis of rotation.

7. The adaptive precision chuck of claim 4, wherein the second flexures are configured to be responsive to rotational forces about the axis of rotation to apply a centering force or forces on the chuck with respect to the machining system to maintain concentric alignment of the mount with the axis of rotation.

8. The adaptive precision chuck of claim 1, wherein each of the plurality of flexures comprises a compliant elastic member configured to flex in response to rotational forces applied about the axis of rotation and return to a non-flexed state upon removal of the rotational forces.

9. The adaptive precision chuck of claim 1, wherein each flexure is integrated into the chuck.

10. The adaptive precision chuck of claim 1, wherein the chuck is monolithic.

11. The adaptive precision chuck of claim 1, wherein the chuck includes a fixing to retain the chuck in position on the machining system after adjustment of the mounted position via the third flexures.

12. The adaptive precision chuck of claim 1, wherein the adaptive precision chuck is mountable to a vacuum chuck system of the machining system.

13. A precision machining system, including an adaptive precision chuck, the chuck defining a mount for receiving a workpiece wherein, when in use the center of the mount is configured to be substantially concentric with an axis of rotation of the machining system, the chuck further including jaws about the mount and a plurality of compliant flexures configured, upon application of rotational forces by the machining system to the chuck about the axis of rotation, to engage the jaws upon a workpiece in the mount, the adaptive precision chuck being configured to receive and retain a workpiece for machining by the machining system, the precision machining system further including a vacuum chuck, the adaptive precision chuck being mounted to the machining system by the vacuum chuck, the mounting to the machining system being adjustable via the flexures.

14. The precision machining system of claim 13 comprising a diamond turning machine.

* * * * *